United States Patent
Asmus et al.

[15] 3,667,226
[45] June 6, 1972

[54] CONTROL FOR A HYDROSTATIC TRANSMISSION

[72] Inventors: Rodger W. Asmus, Downers Grove; William R. Borghoff, Naperville, both of Ill.

[73] Assignee: International Harvester Company, Chicago, Ill.

[22] Filed: Nov. 2, 1970

[21] Appl. No.: 86,375

Related U.S. Application Data

[63] Continuation of Ser. No. 13,856, Feb. 24, 1970, abandoned, which is a continuation of Ser. No. 731,590, May 23, 1968, abandoned.

[52] U.S. Cl. ............................................. 60/53 R, 60/53 A
[51] Int. Cl. ..................................................... F16d 31/06
[58] Field of Search .......................................... 60/53 R, 53 A

[56] References Cited

UNITED STATES PATENTS

| | | |
|---|---|---|
| 3,199,286 | 8/1965 | Anderson .......................... 60/53 R X |
| 3,213,621 | 10/1965 | Swift et al. ............................... 53 A/ |
| 3,284,999 | 11/1966 | Lease ................................ 60/53 A X |
| 3,360,933 | 1/1968 | Swanson et al. ..................... 60/53 A |
| 3,383,857 | 5/1968 | Rajchel et al. ...................... 60/53 A |
| 3,393,509 | 7/1968 | Kampson ............................ 60/53 R |
| 3,398,531 | 8/1968 | Swanson et al. ..................... 60/53 A |

Primary Examiner—Edgar W. Geoghegan
Attorney—Floyd B. Harman

[57] ABSTRACT

For a hydrostatic transmission having valving means which can be selectively positioned corresponding to forward, neutral, and reverse drive of the transmission and including means for dumping excess fluid pressure from the fluid pressure circuit in order to prevent damage to the transmission, and under certain conditions to prevent overspeeding of the transmission to further prevent damage; means are provided whereby fluid flow in a hydrostatic loop can be bypassed from its normal drive path in the transmission, through the valve means provided.

8 Claims, 1 Drawing Figure

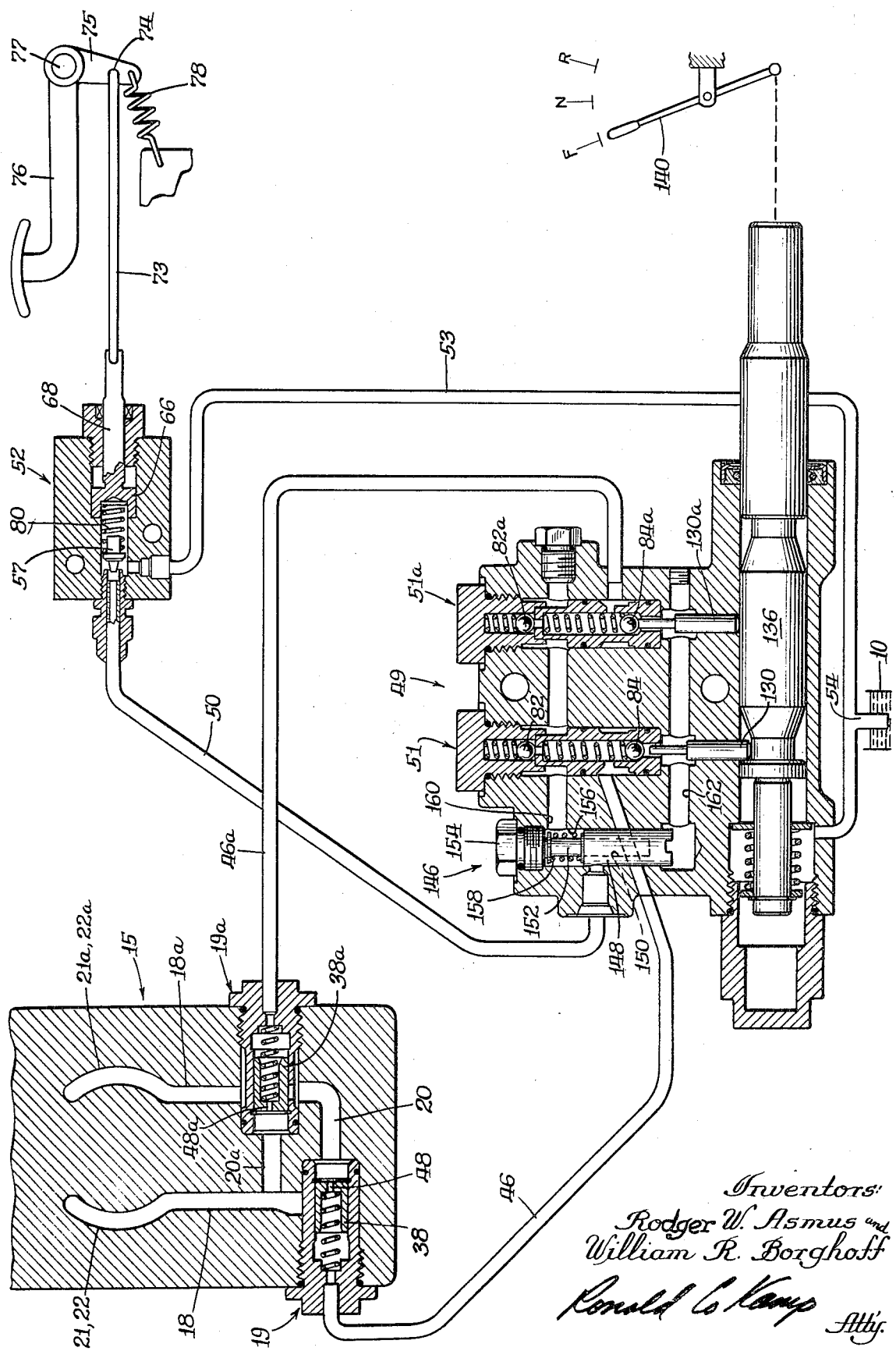

CONTROL FOR A HYDROSTATIC TRANSMISSION

This application is a continuation of application Ser. No. 731,590, filed May 23, 1968, now abandoned.

BACKGROUND AND SUMMARY OF THE INVENTION

The present invention is an improvement over the device disclosed and claimed in an application by Rodger W. Asmus Ser. No. 731,472, now abandoned filed the same day as this application and assigned to the same assignee. The automatic overspeed control disclosed in the aforementioned application permits utilization of the vehicle engine for dynamic braking purposes when the vehicle is coasting. However, certain problems are encountered when the speed and direction of movement control means is rapidly shifted from reverse to forward. When this occurs the control servos, due to their lag in response, will for a short time interval be conditioned for, and will actually have the hydrostatic pump-motor unit swashplates oriented for reverse drive, while the low pressure relief valves will be positioned for forward drive. The anti-coast valve will, therefore, receive the same type of pressure signal it would receive when the power flow through the pump-motor unit is reversed, i.e., when the unit is motoring. The response of the anti-coast valve will be to shift and de-activate the high pressure pilot-relief valve. When the high pressure pilot relief valve is de-activated, disengagement of the drive is prevented, i.e., there is no disruption of the power flow through the transmission. As a consequence, the operator may have the vehicle moving in reverse, suddenly shift to forward drive, and expect the vehicle to be driven in a forward direction. Because the anti-coast valve would prevent drive disengagement, and since the control servos for the swashplates are slow to respond, there will be a short time interval during which reverse drive will continue. During this interval, i.e., until the control servos do position the swashplates for forward drive, the operator will be unable to interrupt the power flow in reverse direction by depressing the pedal control for the manual override on the high pressure pilot-relief valve.

It is, therefore, an object of the present invention to provide a means whereby drive from the hydrostatic transmission may be interrupted even though the transmission control means is rapidly shifted from reverse to forward.

It is also an object of this invention to provide a hydrostatic transmission system with an anti-coast valve having lag characteristics similar to and complementary with the system control servos.

These and other objects and many of the attendant advantages of the present invention will become more readily apparent upon a perusal of the following description and the accompanying drawings, wherein a hydrostatic transmission system is illustrated, portions of which are schematically represented, incorporating a preferred embodiment of the invention.

Referring now to the drawing, there is shown a pump-motor unit, represented schematically at 15, which is similar to that disclosed in the aforementioned copending application filed the same date as this application, and wherein the common motor-pump ports are indicated at 21,22 and 21a,22a. The ports 21, 22 and 21a, 22a communicate with the conduits 18 and 18a respectively and are cross-connected to the high pressure pilot-operated valves 19a and 19 respectively by the conduits 20a and 20. The high pressure pilot-operated relief valves 19 and 19a are provided with slidable sleeves valves 38 and 38a respectively. Each sleeve valve has an orifice 48, 48a communicating with the respective cross-connecting conduit 20, 20a, and communicating with the valve assembly 49 through conduits 46 and 46a respectively. The valve assembly 49 contains two identical valve units 51 and 51a, which are similar to the valve units designated 51, 51a in the aforementioned copending application. Each of the valve units 51 and 51a contains low pressure relief valves 84 and 84a and pressure reducing check valves 82 and 82a. The low pressure relief valves 84 and 84a are conditioned for drive by plungers 130 and 130a, each of which is equipped with a lift pin capable of raising the respective low pressure relief valve from its seat. The plungers 130 and 130a contact a spool 136 having axially spaced sections of reduced diameter. Spool 136 is positioned by a control linkage indicated schematically at 140 and is positionable in a center neutral position wherein both plungers 130 and 130a rest on the central section of the spool 136 and lift both low pressure relief valves 84 and 84a from their seats. In its forward position spool 136 is oriented so that plunger 130 is in contact with the reduced diameter section of the spool 136 permitting the spring biased low pressure relief valve 84 to be seated, while the plunger 130a is supported by the central section of the spool and retains the plunger 130a against the low pressure relief valve 84a to lift it from its seat. The pressure reducing check valves 82 and 82a are biased into contact with their seats and control communication between the respective conduits 46 and 46a and passage 160.

The valve assembly also includes an anti-coast valve, indicated generally at 146, which comprises a spool or movable element 148 having a bore 150 which mates with a guide pin 152. The guide pin is secured to a plug member 154 threadedly secured in a bore 156 in which the spool 148 is slidable. The plug member 154 is suitably sealed against leakage and functions as a reaction member for a spring 158 which is positioned over the guide pin 152 between the plug member 154 and the upper surface of the spool 148. The passage 160 provides fluid communication between the upper end of the bore 156 and the conduits 46 and 46a through internal passages within the valve units 51 and 51a provided the pressure is sufficient to unseat pressure reducing check valves 82 and 82a. The passage 162 provides fluid communication between the lower end of the bore 156 and one of the conduits 46 and 46a depending on which of the plungers 130 and 130a is oriented to unseat the associated low pressure relief valve 84 and 84a. The conduit 50 communicates with the bore 156 at a point intermediate its intersection with the passages 160 and 162. It is arranged so that when the spool 148 is at the bottom of the bore 156 communication between passage 160 and the conduit 50 is complete and uninterrupted, and when moved upward the element 148 blocks the conduit 50 from communication with the bore 156. The spool 148 is shifted by reduction of pressure in the passage 160, in a manner to be explained hereinafter, which creates a pressure differential across the spool 148. The pin 152 is provided with a predetermined clearance with respect to the bore 150. Hence, when the spool 148 is in its lowered position a predetermined amount of hydraulic fluid will be contained within that portion of the bore 150 which is below the end of guide pin 152. As the spool 148 moves upward, the guide pin 152 is inserted farther into the bore 150 forcing the hydraulic fluid through the clearance, which has a dampening effect upon the movement of the spool 148. Knowing the viscosity of the hydraulic fluid under normal operating conditions, this clearance is sized so that the time required for movement of the spool 148 from its position at the bottom of the bore 156 to the point where the spool just seals off conduit 50 is at least equal to the time required for complete response of the control servos.

The conduit 50 communicates with a high pressure pilot and mechanically, overridably controlled feathering and relief valve unit 52 which includes a pilot poppet element 57. This poppet element controls communication between the conduit 50 and a conduit 53 which connects with the reservoir 10 through a conduit 54. The poppet element 57 is biased into its seated position blocking communication between the conduits 50 and 53 by a spring 80 which reacts against a movable stop member 66. Clearance is provided between the poppet element 57 and the stop member 66 to permit the poppet element 57 under the influence of high pressure within the conduit 50 to move away from its seat toward the stop member 66 by compressing the spring 80. The poppet 57 may also be unseated by moving the stop member 66 to the right as viewed in the drawing, which movement is accomplished by depressing pedal 76. The stop member is provided with a guide stem 68 which is pivotally connected to a push-pull rod 73, which in turn is pivotally connected at 74 to one arm 75 of a bell crank. The pedal 76 comprises the other arm of the bell crank which is pivotally mounted to a fixed support at 77. A tension spring 78 is secured between the arm 75 and the fixed support to urge the pedal toward an upward position, and consequently to urge the stop member to the limit of its movement inward of the unit 52.

OPERATION

Assuming that the control linkage 140 is moved to the reverse position, the spool 136 would be moved to the left from the position as viewed in the drawing wherein plunger 130 would unseat low pressure relief valve 84 while plunger 130a would contact the reduced diameter section of the spool 136 thereby permitting the low pressure relief valve 84 to be seated. In reverse the drive pressure is developed in ports 21, 22 and communicates through the cross-connecting conduit 20a, through orifice 48a, and conduit 46a with valve unit 51a. Since low pressure relief valve 84a is seated and low pressure relief valve 84 is unseated, the passage 162 and the bottom of spool 148 is subject to charge pressure transmitted through conduit 46 during normal reverse operations. However, if the unit 15 begins motoring, i.e., the motor is driven as a pump and the pump then functions as a motor such as would occur when the vehicle is being pushed or otherwise forced in a reverse direction, drive pressure is then developed in ports 21a, 22a and drive pressure will appear in conduit 46 where it will be transmitted to the bottom of spool 148 through valve unit 51 and passage 162. If the pedal 76 were then depressed, the fluid in passage 160 would be dumped to the reservoir 10 through the conduit 50, valve unit 52, and conduits 53 and 54. This will reduce the pressure in passage 160 permitting the higher pressure in passage 162 to shift the spool 148 upward closing the conduit 50. This prevents the establishing of flow of fluid through either of the conduits 46,46a which in turn prevents either of the sleeve valves 38 and 38a from shifting to short circuit a large volume of fluid between the ports 21a, 22a and 21, 22. This is because flow must be established through the orifices 48, 48a in order to achieve a pressure drop across the respective sleeve valves 38 and 38a which is necessary to achieve sufficient force to shift the sleeve valves and effect a short circuiting of the hydraulic fluid. In the absence of short circuiting, overspeeding of the unit 15 is prevented and dynamic braking from the power source driving the normal pump is obtained. Excessive pressure developed under such conditions is relieved by unseating the spring seated low pressure relief valve 84 which would permit a low volume short circuiting of fluid through conduit 46, valve unit 51, passage 160, to valve unit 51a and conduit 46a.

Similar results would obtain when the control linkage 140 is positioned for forward drive, though the function of elements referred to by numeral would now be similar to those previously referred to by suffix "a" and vice-versa.

When the control linkage is moved rapidly from reverse to forward the spool 136 is immediately positioned to orient the pressure relief valves 84 and 84a to prevent forward drive. However, the control servos require a certain amount of time before they are conditioned for forward drive. That is, just prior to the rapid movement of the control linkage 140 to forward drive position, the control servos were oriented in an attitude for reverse drive; having tilted the swashplates for the pump-motor unit to effect drive pressure in the ports 21, 22 while the ports 21a, 22a are in receipt of the charge pressure from the charge pump. While the control servos are not illustrated, their construction and operation is well known, and may for example be of the type disclosed in assignee's copending applications Ser. No. 562,888 filed July 5, 1966, now U.S. Pat. No. 3,389,556 and Ser. No. 589,895 filed Oct. 27, 1966, now U.S. Pat. No. 3,387,454; and in U.S. Pat. No. 3,360,934 issued Jan. 2, 1968. In the forward drive position, the port 21a, 22a is subjected to drive pressure which is transmitted through the conduit 46 to valve unit 51. The conduit 46a would normally be subject only to the much lower charge pressure, which pressure will be transmitted to the bottom of the spool element 148, through the conduit 46a, to valve unit 51 a, past the unseated low pressure relief valve 84a, and through passage 162 to the bottom of bore 156. Drive pressure, reduced by a small amount of pressure drop across the valve 82 would be present in the passageway 160, it being much greater than the pressure in passage 162, would retain the spool 148 in its lowermost position. However, until the servos can move the swashplates of the pump-motor unit 15 from reverse orientation to forward orientation, the port 21,22 will be subjected to drive pressure. Consequently, the conduit 46a will receive drive pressure in the same manner it would if the control linkage 140 were oriented for forward drive and the unit 15 were motoring. Drive pressure is then present in passage 162, and if the operator depresses the pedal 76, as he would instinctively do when the machine is being powered in one direction and he desires a sudden disruption of the power in that direction and an application of power in the opposite direction, flow is established through conduit 50, through the valve unit 52, and conduits 53 and 54 to the reservoir 10. The reduction in pressure resulting therefrom in the passage 160 will permit the drive pressure present in passage 162 to urge the movable element 148 upward. The spool 148 can move upward only as fast as the hydraulic fluid in the bore 150 can be expelled through the clearance between the pin 152 and the bore 150. Since this clearance meters the discharge of hydraulic fluid from the bore 150, the rate of movement of the spool 148 is slow, and the conduit 50 will not be completely blocked until the control servos have had time to reorient the swashplates of the unit 15. Flow of hydraulic fluid will therefore be established within the conduit 46, through the valve unit 51a, past the unseated pressure reducing valve 82a, through passage 160, the upper portion of bore 156, conduit 50, past the unseated poppet element 57 and through conduits 53 and 54 to the reservoir 10. This flow will be sufficient to create a pressure drop across orifice 48awhich will shift the sleeve valve 38a to the right as viewed in the drawing. The drive pressure being developed in port 21, 22 can then be short circuited through cross conduit 20a to the intake or charge pressure ports 21a,22a. When this occurs no power can be transmitted to the drive wheels of the vehicle from the unit 15.

It will be appreciated from the foregoing description, that the operator will have complete control of the vehicle even though he has made a rapid shift from reverse to forward, and will not be surprised by the application of power in a direction opposite to that which he has selected. In addition, all of the attributes of the anti-coast valve are retained which preclude overspeeding of the transmission and the possible damaging effects such overspeeding may occasion, while dynamic braking effects will be preserved.

While a preferred embodiment of the invention has been specifically disclosed herein, it is to be understood that the invention is not limited thereto as other variations will be apparent to those skilled in the art and the invention is to be given its fullest possible interpretation within the scope of the following claims:

We claim:

1. In a hydrostatic transmission having a variable displacement pump and motor hydraulically interconnected to form a closed circuit for transmitting power therethrough, a reservoir source of fluid, and speed and direction of movement control means connected to at least one of said pump and motor and movable in opposite directions from a neutral center position for controlling displacement to selectively produce forward and reverse direction of drive of said motor when the power flow is from the pump to the motor, the combination therewith, comprising:

a pair of high pressure pilot-operated relief valves communicatively connected across opposite sides of said closed circuit and normally closed to fluid flow between opposite sides of said closed circuit but each of which is operable responsive to development of a pressure differential thereacross for shortcircuiting fluid flow between opposite sides of said circuit;

said high pressure valves having pilot pressure passages therein open to fluid pressures in opposite sides of said circuit;

low pressure valve means;

high pressure pilot valve means;

first fluid passage means connecting said low pressure valve means and high pressure pilot means together and connecting said latter means to said reservoir;

second fluid passage means connecting said low pressure valve means with said pilot pressure passages whereby said low pressure valve means are selectively subjectable to pilot pressures from opposite sides of said closed circuit;

valve positioning means adapted to operatively connected with said control means for presetting said low pressure valve means into positions corresponding to said positions of said control means;

said low pressure valve means being normally closed to pilot pressure between opposite sides of said circuit, when power flow is from the pump to the motor, but being operatively responsive, when the power flow is from the motor to the pump, to an increase of pilot pressure for short-circuiting a portion of the fluid flow therein between opposite sides of said closed circuit and incident thereto opening a corresponding one of said high pressure pilot operated valves to effect a short-circuiting of the remainder of the fluid flow in said closed circuit between opposite sides thereof whereby the flow of power through said unit is disrupted;

anti-coast valve means disposed in said first fluid passage means and responsive to pressure developed when the power flow is from the motor to the pump to block flow to said high pressure pilot valve means whereby the dynamic braking may continue to be utilized; and dampening means associated with said anti-coast valve means for controlling its rate of movement.

2. In a hydrostatic transmission having a variable displacement pump and motor hydraulically interconnected to form a closed circuit for transmitting power therethrough, a reservoir source of fluid, and speed and direction of movement control means connected to at least one of said pump and motor and movable at a given rate in opposite directions from a neutral center position for controlling displacement to selectively produce forward and reverse direction of drive of the motor when the power flow is from the pump to the motor, the combination therewith, comprising:

a pair of high pressure pilot-operated relief valves communicatively connected across opposite sides of said circuit and normally closed to fluid flow between opposite sides of said circuit, but each of which is operable responsive to development of a pressure differential thereacross for short-circuiting fluid flow between opposite sides of said circuit;

one of said high pressure relief valves receiving drive pressure from the pump with the transmission displaced for drive in a reverse direction, when the power flow is from the pump to the motor, and receiving motor pressure from the motor with the transmission displaced for drive in a forward direction, when the power flow is from the motor to the pump;

a manually controllable poppet valve means normally blocking communication between said high pressure relief valves and said reservoir but manually movable to permit such communication;

anti-coast valve means interposed between and normally permitting fluid communication between said poppet valve means and said high pressure relief valves;

a pair of low pressure relief valves normally blocking communication between said high pressure relief valves and said anti-coast valve;

valve positioning means associated with said control means for opening the low pressure relief valve associated with said one high pressure relief valve for subjecting said anti-coast valve to the pressure received by said one high pressure relief valve;

said anti-coast valve being movable responsive to receiving drive and motoring pressure to block communication with said poppet valve means;

and dampening means for controlling the movement of said anti-coast valve so that its rate of movement is no greater than said given rate.

3. The combination according to claim 2 wherein said dampening means comprises:

a guide pin;

said anti-coast valve having a bore mating with and slidable on the guide pin and defining therewith a clearance;

said clearance metering the flow of hydraulic fluid into and out of said bore to thereby control the rate of movement of said anti-coast valve.

4. In a hydrostatic transmission having a pump and motor hydraulically interconnected to form a closed circuit for transmitting power therethrough, at least one of said pump and motor having a variable displacement, a reservoir source of fluid, and speed and direction of movement control means connected to said one of said pump and motor and movable in opposite directions from a neutral center position for controlling displacement to selectively produce forward and reverse direction of drive of said motor when the power flow is from the pump to the motor, the combination therewith, comprising:

a pair of high pressure pilot-operated relief valves communicatively connected across opposite sides of said closed circuit and normally closed to fluid flow between opposite sides of said closed circuit but each of which is operable responsive to development of a pressure differential thereacross for short-circuiting fluid flow between opposite sides of said circuit;

said high pressure valves having pilot pressure passages therein open to fluid pressures in opposite sides of said circuit;

low pressure valve means;

high pressure pilot valve means;

first fluid passage means connecting said low pressure valve means and high pressure pilot means together and connecting said latter means to said reservoir;

second fluid passage means connecting said low pressure valve means with said pilot pressure passages whereby said low pressure valve means are selectively subjectable to pilot pressures from opposite sides of said closed circuit;

valve positioning means adapted to be operatively connected with said control means for presetting said low pressure valve means into positions corresponding to said positions of said control means;

said low pressure valve means being normally closed to pilot pressure between opposite sides of said circuit, when power flow is from the pump to the motor, but being operatively responsive, when the power flow is from the motor to the pump, to an increase of pilot pressure for short-circuiting a portion of the fluid flow therein between opposite sides of said closed circuit and incident thereto opening a corresponding one of said high pressure pilot-operated valves to effect a short-circuiting of the remainder of the fluid flow in said closed circuit between opposite sides thereof whereby the flow of power through said unit is disrupted;

anti-coast valve means disposed in said first fluid passage means and responsive to pressure developed when the power flow is from the motor to the pump to block flow to said high pressure pilot valve means whereby the dynamic braking may continue to be utilized; and dampening means associated with said anti-coast valve means for controlling its rate of movement.

5. In a hydrostatic transmission having a pump and motor hydraulically interconnected to form a closed circuit for transmitting power therethrough, a reservoir source of fluid, at least one of said pump and motor having a variable displacement, and speed and direction of movement control means connected to said one of said pump and motor and movable at a given rate in opposite directions from a neutral center position for controlling displacement to selectively produce forward and reverse direction of drive of the motor when the power flow is from the pump to the motor, the combination therewith, comprising:

a pair of high pressure pilot-operated relief valves communicatively connected across opposite sides of said circuit and normally closed to fluid flow between opposite sides of said circuit, but each of which is operable responsive to development of a pressure differential thereacross for short-circuiting fluid flow between opposite sides of said circuit;

one of said high pressure relief valves receiving drive pressure from the pump with the transmission displaced for drive in a reverse direction, when the power flow is from the pump to the motor, and receiving motor pressure from the motor with the transmission displaced for drive in a forward direction, when the power flow is from the motor to the pump;

a manually controllable poppet valve means normally blocking communication between said high pressure relief valves and said reservoir but manually movable to permit such communication;

anti-coast valve means interposed between and normally permitting fluid communication between said poppet valve means and said high pressure relief valves;

a pair of low pressure relief valves normally blocking communication between said high pressure relief valves and said anti-coast valve;

valve positioning means associated with said control means for opening the low pressure relief valve associated with said one high pressure relief valve for subjecting said anti-coast valve to the pressure received by said one high pressure relief valve;

said anti-coast valve being movable responsive to receiving drive and motoring pressure to block communication with said poppet valve means;

and dampening means for controlling the movement of said anti-coast valve so that its rate of movement is no greater than said given rate.

6. The combination according to claim 5 wherein said dampening means comprises:

a guide pin;

said anti-coast valve having a bore mating with and slidable on the guide pin and defining therewith a clearance;

said clearance metering the flow of hydraulic fluid into and out of said bore to thereby control the rate of movement of said anti-coast valve.

7. A control system for a transmission having variable displacement pump and motor units and a hydraulic interconnection between same for transmitting power between said units, an improved control servo means comprising:

a. control means for variably controlling the power transfer from said pump unit to said motor unit in forward or reverse directions;

b. means associated with said hydraulic interconnection for limiting power transmission from said motor unit to said pump unit so as to permit dynamic braking of the transmission while minimizing overspeed conditions;

c. feathering control means associated with said transmission for interrupting power transmission from said pump to said motor, and d. dashpot means associated with said feathering control valve for normally precluding interruption of power transmission from said motor to said pump, but permitting such power transmission when said servos are moving from forward to reverse or reverse to forward drive.

8. A control system for a transmission having a pump unit and a motor unit and a hydraulic interconnection between same for transmitting power between said units, an improved control means comprising:

a. means associated with said hydraulic interconnection for limiting power transmission from said motor unit to said pump unit so as to permit dynamic braking of the transmission, b. feathering control valve means associated with said transmission for interrupting transmission of power between said pump and said motor, and c. time delayed anti-coast means operatively associated with said feathering control valve means for overriding same so as to preclude only interruption of power transmission from said motor to said pump.

* * * * *